United States Patent
Klischat et al.

(10) Patent No.: US 9,809,498 B2
(45) Date of Patent: Nov. 7, 2017

(54) REFRACTORY COARSE CERAMIC PRODUCT AND METHOD FOR PRODUCING THE SAME AND ITS USE

(71) Applicant: Refratechnik Holding GmbH, Ismaning (DE)

(72) Inventors: Hans-Juergen Klischat, Goettingen (DE); Carsten Vellmer, Goettingen (DE); Holger Wirsing, Goettingen (DE)

(73) Assignee: Refratechnik Holding GmbH, Ismaning (DE)

(*) Notice: Subject to any disclaimer, the term of this patent is extended or adjusted under 35 U.S.C. 154(b) by 0 days.

(21) Appl. No.: 15/103,030

(22) PCT Filed: Oct. 21, 2014

(86) PCT No.: PCT/EP2014/072569
§ 371 (c)(1),
(2) Date: Jun. 9, 2016

(87) PCT Pub. No.: WO2015/086204
PCT Pub. Date: Jun. 18, 2015

(65) Prior Publication Data
US 2016/0304403 A1    Oct. 20, 2016

(30) Foreign Application Priority Data

Dec. 10, 2013    (DE) .................. 10 2013 020 732

(51) Int. Cl.
*C04B 38/00*    (2006.01)
*C04B 35/043*    (2006.01)
(Continued)

(52) U.S. Cl.
CPC ............ *C04B 35/043* (2013.01); *C04B 35/03* (2013.01); *C04B 35/047* (2013.01);
(Continued)

(58) Field of Classification Search
CPC . C04B 38/00; C04B 38/0038; C04B 38/0051; C04B 38/0058; C04B 38/0067
See application file for complete search history.

(56) References Cited

U.S. PATENT DOCUMENTS

| | | |
|---|---|---|
| 3,992,213 A | 11/1976 | Desouches et al. |
| 7,968,483 B2 | 6/2011 | Djuricic et al. |
| 8,633,291 B2 | 1/2014 | Ebbrecht et al. |

FOREIGN PATENT DOCUMENTS

| | | |
|---|---|---|
| DE | 2 044 885 A1 | 4/1971 |
| DE | 22 00 002 A1 | 7/1972 |

(Continued)

OTHER PUBLICATIONS

ISO 836, Terminology for refractories, First edition, Mar. 15, 2001, 40 pages.
(Continued)

*Primary Examiner* — Noah Wiese
(74) *Attorney, Agent, or Firm* — Collard & Roe, P.C.

(57) ABSTRACT

A refractory, coarse ceramic product including at least one granular refractory material, has an open porosity of between 22 and 45 vol.-%, in particular of between 23 and 29 vol.-%, and a grain structure of the refractory material, wherein the medium grain size fraction with grain sizes of between 0.1 and 0.5 mm is 10 to 55 wt.-%, in particular 35 to 50 wt.-%, and wherein the remainder of the grain structure is a finest grain fraction with grain sizes of up to 0.1 mm and/or coarse-grain fraction with grain sizes of more than 0.5 mm.

21 Claims, 3 Drawing Sheets

(51) Int. Cl.
| | |
|---|---|
| C04B 35/03 | (2006.01) |
| C04B 35/047 | (2006.01) |
| C04B 35/101 | (2006.01) |
| C04B 35/12 | (2006.01) |
| C04B 35/18 | (2006.01) |
| C04B 35/20 | (2006.01) |
| C04B 35/44 | (2006.01) |
| C04B 35/443 | (2006.01) |
| C04B 35/48 | (2006.01) |
| C04B 35/565 | (2006.01) |
| C04B 35/626 | (2006.01) |
| C04B 35/634 | (2006.01) |
| C04B 35/64 | (2006.01) |

(52) U.S. Cl.
CPC ........ *C04B 35/0435* (2013.01); *C04B 35/101* (2013.01); *C04B 35/12* (2013.01); *C04B 35/18* (2013.01); *C04B 35/20* (2013.01); *C04B 35/44* (2013.01); *C04B 35/443* (2013.01); *C04B 35/48* (2013.01); *C04B 35/565* (2013.01); *C04B 35/62695* (2013.01); *C04B 35/63404* (2013.01); *C04B 35/64* (2013.01); *C04B 2235/3206* (2013.01); *C04B 2235/3222* (2013.01); *C04B 2235/3241* (2013.01); *C04B 2235/3243* (2013.01); *C04B 2235/3272* (2013.01); *C04B 2235/349* (2013.01); *C04B 2235/3445* (2013.01); *C04B 2235/48* (2013.01); *C04B 2235/5427* (2013.01); *C04B 2235/5436* (2013.01); *C04B 2235/5463* (2013.01); *C04B 2235/5472* (2013.01); *C04B 2235/602* (2013.01); *C04B 2235/656* (2013.01); *C04B 2235/77* (2013.01); *C04B 2235/785* (2013.01); *C04B 2235/963* (2013.01)

(56) References Cited

FOREIGN PATENT DOCUMENTS

| | | | |
|---|---|---|---|
| DE | EP 1 260 289 A1 * | 11/2002 | ............... B22D 1/00 |
| DE | 10 2006 040 269 B4 | 3/2008 | |
| EP | 1 260 289 A1 | 11/2002 | |
| EP | 1 852 405 A2 | 11/2007 | |
| GB | 755 514 A | 8/1956 | |
| GB | 1 297 838 A | 11/1972 | |
| GB | 1 327 749 A | 8/1973 | |
| JP | H03141151 A | 6/1991 | |
| JP | H11 60340 A | 3/1999 | |
| JP | H11292624 A | 10/1999 | |
| JP | 2012-062232 A | 3/2012 | |
| JP | 2013 001584 A | 1/2013 | |
| WO | 2008/025441 A1 | 3/2008 | |

OTHER PUBLICATIONS

DIN 51060, Definition der Begriffe feuerfest, hochfeuerfest, Jun. 2000, 1 page.

DIN EN 993-1, Methods of test for dense shaped refractory products, Determination of bulk density, apparent porosity and true porosity, Apr. 1995, 10 pages.
DIN EN 993-4, Methods of test for dense shaped refractory products, Determination of permeability to gases, Apr. 1995, 13 pages.
DIN EN 993-5, Methods of test for dense shaped refractory products, Part 5: Determination of cold crushing strength, Dec. 1998, 10 pages.
DIN EN 993-6, Methods of test for dense shaped refractory products, Determination of modulus of rupture at ambient temperature, Apr. 1995, 9 pages.
DIN EN 993-10, Methods of test for dense shaped refractory products, Part 10: Determination of permanent change in dimensions on heating, Feb. 1998, 13 pages.
DIN EN 993-11, Methods of test for dense shaped refractory products, Part 11: Determination of resistance to thermal shock, Mar. 2008, 13 pages.
DIN EN 993-15, Methods of test for dense shaped refractory products, Part 15: Determination of thermal conductivity by the hot-wire (parallel) method, Jul. 2005, 16 pages.
DIN EN 993-19, Methods of test for dense shaped refractory products, Part 19: Determination of thermal expansion by a differential method, Aug. 2004, 12 pages.
DIN 66 165—Part 1, Particle size analysis, Sieve analysis, General Principles, Apr. 1987, pp. 1-6.
Gerald Routschka/Hartmut-Wuthnow, Practical Handbook of "Refractory Materials", 5th Edition, Vulkan-Verlag, pp. 1-7 (with translation pp. 1-7) (2011).
Gerald Routschka/Hartmut-Wuthnow, Practical Handbook of "Refractory Materials", 5th Edition, Vulkan-Verlag pp. 15-20 (with translation pp. 13-18) (2011).
Gerald Routschka/Hartmut-Wuthnow, Practical Handbook of "Refractory Materials", 5th Edition, Vulkan-Verlag, p. 16, Table 21 (with translation p. 14) (2011).
Gerald Routschka/Hartmut-Wuthnow, Practical Handbook of "Refractory Materials", 5th Edition, Vulkan-Verlag, Table 3.2 on pp. 28, 29 (with translation p. 25) (2011).
Gerald Routschka/Hartmut-Wuthnow, Practical Handbook of "Refractory Materials", 5th Edition, Vulkan-Verlag, p. 127, Table 4.43 (with translation p. 107) (2011).
Gerald Routschka/Hartmut-Wuthnow, Practical Handbook of "Refractory Materials", 5th Edition, Vulkan-Verlag, pp. 211-214 (with translation pp. 175-179) (2011).
Gerald Routschka/Hartmut-Wuthnow, Practical Handbook of "Refractory Materials", 5th Edition, Vulkan-Verlag, pp. 306-307, Fig. A17 (with translation p. 252) (2011).
International Search Report of PCT/EP2014/072569, dated Dec. 23, 2014.
Gerald Routschka/Hartmut Wuthnow (Hrsg.) "Praxishandbuch Feuerfeste Werkstoffe, Aufbau—Eigenschaften—Prüfung", Fifth Edition (2011) (7 pages) and corresponding pages of the English version Gerald Routscka, Hartmut Wuthnow (Editors) "Handbook of Refractory Materials, Design—Properties—Testing", Fourth Edition (2012) (5 pages).
H.Salmang/H.Scholze, "Keramik", 7., vollständig neubearbeitete und erweuterte Auflage, Herausgegeben von Rainer Telle, Springer (2007) (71 pages).

* cited by examiner

REFRACTORY COARSE CERAMIC PRODUCT AND METHOD FOR PRODUCING THE SAME AND ITS USE

CROSS REFERENCE TO RELATED APPLICATIONS

This application is the National Stage of PCT/EP2014/072569 filed on Oct. 21, 2014, which claims priority under 35 U.S.C. §119 of German Application No. 10 2013 020 732.0 filed on Dec. 10, 2013, the disclosure of which is incorporated by reference. The international application under PCT article 21(2) was not published in English.

BACKGROUND OF THE INVENTION

1. Field of the Invention

The invention relates to a coarse ceramic refractory product of at least one refractory material. The invention also relates to the manufacture of the product and its use.

Coarse ceramic refractory products according to the invention are ceramically fired or unfired shaped, especially pressed monolithic products, which are manufactured in a ceramic factory or made by the user, and which are used in industrial firing or melting systems or in other fired industrial aggregates, e.g. in a large volume industrial furnace, for refractory lining of these.

Within the scope of the invention, the term "refractory" is not intended to be limited to the definition in accordance with ISO 836 or DIN 51060, which define a pyrometric cone equivalent of >1500° C. Instead, the term is intended to relate to products used for protection of aggregate constructions in aggregates in which temperatures between 600 and 2000° C. prevail, especially between 1000 and 1800° C.

2. Description of the Related Art

It is known to the person skilled in the art that refractory materials are based on six refractory base oxides as well as carbon and refractory carbon compounds, which are named and classified in, for example, "Gerald Routschka/Hartmut-Wuthnow, Practical Handbook of "Refractory Materials", 5th Edition, Vulkan-Verlag (abbreviated as merely "Practical Handbook" in the following), pp. 1-7". In addition, primary uses of the products manufactured from the refractory materials are indicated there.

SUMMARY OF THE INVENTION

The invention relates to the coarse-ceramic manufacture, known in itself, of the refractory products corresponding to Practical Handbook pp. 15-20. In particular, shaped and especially pressed refractory products according to the invention are intended to have a cold compressive strength that is adapted to the purpose of use and in particular is also intended to be adequately high for their ease of handling during and after their manufacture and also even after temperature cycling. Furthermore, they are intended to guarantee thermal stability at application temperatures, corrosion resistance, thermal shock resistance, good microstructural elasticity, adapted creep in compression, low gas permeability and high hot bending strength.

Furthermore, products according to the invention are intended to be suitable as working casings, i.e. as lining facing the fireside of the furnace or rather facing the interior of the aggregate and at the same time to conform with the respective requirements, but in addition to also have a lower thermal conductivity in comparison respectively with the products used until now for this purpose.

Coarse ceramic refractory products from respectively different refractory materials, which are possibly usable as working casings and by virtue of a high open porosity probably also have a relatively low thermal conductivity are known from DE 10 2006 040 269 B4. These known products and also most other known working-casing products with low porosity available on the market have the property of expanding volumetrically during temperature elevation and shrinking, usually reversibly, during subsequent temperature lowering, which is tested regularly after their manufacture and before their use, e.g. according to DIN-EN 993-19. This property is also known by the term "reversible thermal expansion". This behavior is countered by the incorporation of appropriate, so-called expansion joints in a refractory masonry structure or in a refractory monolithic lining. (Within the scope of the invention, monolithic means that a lining has been created locally from a shapeless, processable freshly mixed mass, e.g. a freshly mixed concrete mass.)

However, the most known coarse ceramic refractory products change their volume not only reversibly but instead also irreversibly in situ, i.e. in service in the fired aggregate during temperature fluctuations, by the fact that a so-called irreversible post-shrinkage takes place. This post-shrinkage is due, for example, to incomplete sintering, phase transformations or chemical reactions in a shaped or unshaped product.

Because of the post-shrinkage, from which an irreversible volume change that until now had been unavoidable results, the joints between the refractory products of a lining of an aggregate are opened. This leads to loosening and instability of a working-casing masonry structure or of a refractory monolithic working-casing block or lining. The post-shrinkage of refractory products is tested according to DIN EN 993-10, by determining irreversible length changes.

The task of the invention is to reduce, at least considerably, the post-shrinkage of coarse ceramic refractory products that are suitable for a working casing but tend to post-shrinkage, and specifically to do so without intolerable influence on their respective properties matched to the application, such as, for example, the specified cold compressive strength (mechanical), in situ the specified strength during the thermal and mechanical loading (thermomechanical) and also in situ the resistance to chemical attack (thermochemical). At the same time, it is additionally intended in particular that a lower thermal conductivity be assured in comparison with working-casing linings, having relatively high thermal conductivity, that have been used until now.

Until now the reduction of the thermal conductivity of refractory blocks has usually been achieved by multi-layer casing arrangements of working and insulating layers. Especially in moving aggregates such as, for example, cement rotary kilns, multi-layer casings are mechanically very sensitive or susceptible to rupture. Moreover the installation is complex. In order to avoid the uncertainties arising in operation due to so-called intermediate-layer casings, the installation of working casings without insulating layer is not unusual. However, higher temperatures, which load the material of an aggregate jacket, and higher heat losses are associated with this.

It is therefore also a goal of the present invention to provide coarse ceramic refractory products, especially shaped by pressing, with reduced thermal conductivity due to higher porosity, that, as indicated above, are mechanically, thermomechanically and thermochemically suitable as working casings and what is more guarantee at least comparable required properties as do coarse ceramic refractory products with lower porosity, wherein at the same time it is intended that the post-shrinkage also will at least be reduced.

The task according to the invention is accomplished by the features as described herein. Advantageous embodiments of the invention are also described herein.

The invention indeed provides more highly porous refractory products that are suitable as working casings but nevertheless are more volume-stable with respect to firing shrinkage and post-shrinkage than were known according to the prior art for working casings. In comparison with the prior art, e.g. according to DE 10 2006 040 269 B4, the refractory products according to the invention exhibit clearly reduced coarse-grained fractions of >0.5 mm, although the medium-grained fraction of grain size 0.1 to 0.5 mm is increased and the so-called flour-grained fraction smaller than 0.1 mm is also preferably increased. Within the scope of the invention, grain-size ranges >0.5 and up to 8, for example, especially up to 6 mm, for example, is to be understood by "coarse grain" and grain-size ranges between 0.1 and 0.5 mm as "medium grain", wherein the fraction <0.1 mm is the flour-grained or fine-grained fraction. The grain structure results not only in the said novel improved properties with respect to firing shrinkage, post-shrinkage and porosity but also in an improved processing behavior of pressable or shapeable masses manufactured from it, which contain at least one binder and/or at least one agent and/or at least one additive and/or water and from which the unfired and/or fired refractory products according to the invention are manufactured.

According to the invention, a coarse ceramic, especially pressed refractory product shaped according to the invention is therefore characterized independently of the material composition by an open porosity of 22 vol % to 45 vol %, especially of 23 to 29 vol %, and a grain structure of the refractory material or, if several mixed refractory materials are used, of the material mixture, as established, for example, by appropriate sieving, in which the medium-grained fraction with a grain size between 0.1 and 0.5 mm amounts to 30 to 55, especially 35 to 50 wt %, wherein the rest of the grain structure of the product is flour-grained fraction and/or coarse-grained fraction. Preferably a grain structure according to the invention with normal grain-size distribution of the material or, if several refractory materials are used, of the material mixture, is characterized after a sieving with appropriate sieves as follows:

up to 0.1 mm: 20-61, especially 25 to 55 wt %

0.1-0.5 mm: 30-55, especially 35 to 50 wt % above 0.5 mm up to 8 mm, for example, especially up to 6 mm: 0-25, especially 10 to 25 wt %

In ceramic refractory products the found limit values of a grain structure are usually optimum limit values which—as the person skilled in the art knows—may deviate in some refractory materials or material mixtures by ±10% below and/or above with equally effective and equivalent results relative to an accomplishment according to the invention of a task according to the invention.

The indicated wt % (also referred to as mass % in the following) relate only to the grain structure of the refractory material or of the refractory material mixture and not to further grain sizes of common components, additionally admixed in minor proportions, of a refractory product according to the invention, such as binders and/or chemical agents or mineral additives, such as, for example, antioxidants, which may be present in total in proportions of at most 10 wt %.

The coarse ceramic, especially pressed refractory products shaped according to the invention are usable, despite high porosity, as working casings in a fired industrial furnace aggregate as substitute for standard, so-called dense pressed refractory products that have been used until now, because they have the necessary mechanical, thermomechanical and thermochemical working-casing properties.

This is surprising, since it is generally known that the most standard shaped and pressed coarse ceramic refractory products, to which the invention relates, only have open porosities up to approximately 21 vol %, if the desired properties adjusted for the application are to be guaranteed (as regards porosity, see Practical Handbook, p. 127, Plate 4.43, for porosity of magnesia-spinel, spinel, magnesia-zirconia and magnesia-zircon bricks). These standard shaped coarse ceramic, pressed refractory products are therefore also known as dense refractory products in comparison with refractory thermally insulating products of higher porosity, which are referred to as thermally insulating or lightweight refractory bricks and have higher total porosities of at least 45 vol % (Practical Handbook, pp. 211-214). As is known, the porosity has a considerable influence on the mechanical, thermomechanical and thermochemical properties of the shaped coarse ceramic refractory products. With increasing porosity, the properties are typically changed drastically (Practical Handbook, p. 307, Fig. A17).

It is surprising that this is not the case or not to this drastic extent in shaped, coarse ceramic refractory products according to the invention, as will still be demonstrated in the examples described further on.

The grain structure according to the invention, which permits the adjustment of high open porosity in the shaped, coarse ceramic refractory products according to the invention from a refractory fill material by pressing during shaping, surprisingly also guarantees a reduction of the so-called firing shrinkage, which usually occurs unavoidably during ceramic firing of a shaped green refractory product or under ceramic firing conditions of a shaped green refractory product according to the invention or of a unshaped green monolithic product according to the invention, in which a thermal load or the ceramic firing takes place only in situ on the side facing the fire in an industrial furnace aggregate. This firing shrinkage is not the reversible volume change that occurs during temperature fluctuations or the irreversible post-shrinkage.

Standard refractory working-casing products usually have a typically continuous grain-size structure, which includes between 20 and 40 wt % of the 0.1 to 1 mm grain-size fraction (Practical Handbook, p. 16, Table 2.1), wherein the grain-size fraction of 0.1 to 0.5 mm relevant to the invention lies under the limit of 30 wt % in the prior art, since the fraction between 0.5 and 1 mm amounts to more than 10 wt %.

For the manufacture of shaped, especially pressed refractory products according to the invention, mixtures in grain-structure ranges found within the scope of the invention are composed of at least one refractory material and preferably are mixed with at least one binder suitable for the manufacture of refractory products and/or at least one standard agent and/or at least one common additive and/or water. The mass is introduced into molds and pressed, so that shaped articles are formed. The pressing pressures are chosen in such a way according to the invention that a porosity is achieved that amounts to at least 22 vol %, preferably exceeds 22 vol % and in particular amounts to as much as 45 vol % in the ready-to-use unfired or ready-to-use fired product. It has been found that pressing pressures of 10 to 60, especially of 10 to 40 MPa, thus relatively low pressing pressures, are optimum in comparison with commonly used pressing pressures of 60 to 150 MPa. Obviously the grain-size distribution of the material mixtures in the medium-grained size range between 0.1 and 0.5 mm, the grain-size distribution of which can be expediently adjusted, for example, continuously in this range or can have, for example, a Gaussian distribution, in combination with the indicated quantitative proportions of this grain-size range in the overall grain-structure mixture, ensures that the pore volume according to the invention can be formed, especially during pressing, and that the grains of this grain-size range guarantee a support framework in the microstructure of the shaped coarse ceramic product according to the invention, which through a mutual bracing of the grains contributes to a reduction of the firing shrinkage and/or of the post-shrinkage or at least to a considerable reduction of the post-shrinkage.

For the refractory products according to the invention, refractory materials such as magnesia, doloma, magnesium aluminate spinel, hercynite, forsterite, pleonast, chromium ore, zirconia, calcium aluminate, calcium hexaaluminate, alumina and aluminosilicate raw materials, SiC, bond clay, respectively alone or else in expedient combination of at least two materials, for example, are used. The invention is particularly effective with refractory materials on the basis of at least one of the following materials: magnesia, doloma, fireclay, andalusite, forsterite, bauxite. The invention is quite particularly effective with at least one of the following materials on the basis of magnesia with magnesium aluminate spinel magnesia with hercynite magnesia with forsterite magnesia with pleonast magnesia with chromium ore.

Shaped coarse ceramic refractory products are usually manufactured under use of suitable binders. Examples of those, indicated together with standard added proportions, are contained in Table 3.2 on pp. 28, 29 in the Practical Handbook. It has been shown within the scope of the invention that microstructures desired according to the invention develop especially when, and especially in the preferably used materials, water and/or at least one synthetic-resin binder, especially hot-curing, commonly used for refractory products, such as a phenol-formaldehyde resin, or lignin sulfonate, is used as binder in proportions of 3 to 9 wt %, especially of 4 to 6 wt % relative to the dry substance of the material starting mixture to be pressed for shaped pressed products, from which an improved press-ability is achieved for the manufacture of the microstructure desired according to the invention with the desired pore volume and the bracing support-grain framework resulting from the 0.1 to 0.5 mm grain-size fraction and in particular preventing or greatly reducing the post-shrinkage. For monolithic products according to the invention, these binders are used equally well with favorable effect.

A particularly suitable method for the manufacture of coarse ceramic refractory products according to the invention, suitable as working casings, with greatly reduced post-shrinkage, lower thermal conductivity and higher porosity in comparison with conventional dense working-casing products, provides using at least one grainy material, especially with the following grain structure:

up to 0.1 mm: 20-61, especially 25 to 55 wt %

0.1-0.5 mm: 30-55, especially 35 to 50 wt % above 0.5 mm up to 6 mm, for example, or up to 8 mm: 9-25, especially 10 to 25 wt %

Within the scope of the present invention, the term "grain" or "grains" or "grainy" or "grain size" or "grain structure" means that the product is produced as usual from a size reduction, e.g. by grinding or crushing of coarse-grained material, and has an irregular splintery spatial shape of the grains, in contrast to granules, which are formed by agglomeration from grains at least of one refractory material in a granulating aggregate and thus have rounded, e.g. spherical spatial shapes.

If several materials of different grain structure are used, they are mixed dry for 2 to 4 minutes, for example, wherein the mixture then corresponds to the above grain structure according to the invention.

Within the scope of the invention, materials or material mixtures are used that would also be usable for the manufacture of standard dense refractory working-casing products for the same purpose.

It is expedient to add, to the material or material mixture, at least one binder, e.g. water and/or tar and/or pitch and/or preferably at least one synthetic-resin binder used commonly for refractory products, e.g. a phenol-formaldehyde or furan or novolac resin, and/or lignin sulfonate, respectively in proportions of, for example, 3 to 9, especially 4 to 6 wt % relative to the dry substance of the material starting mixture to be pressed for shaped pressed products. Then mixing is carried out for 3 to 10 minutes, for example, for optimum distribution of the binder or binders. The binder proportion and the type of mixing or the mixer are preferably selected such that a so-called mixer granulate is formed from granules with granule diameters between 0.1 and 5 mm, for example, especially between 0.5 and 4 mm. It is expedient to add, for example to spray further water and/or binder into the mixture during the granulation.

Preferably a so-called agglomerating granulation is performed following this mixer granulation or, with omission of the mixer granulation and only after a simple intermixing with the materials to be granulated that have been introduced into the mixture, e.g. in a granulating mixer or a granulating drum or on a granulating pan, e.g. for 3 to 6 minutes, wherein agglomerated granules with granule diameters between 2 and 15 mm, especially between 3 and 6 mm, are produced.

The granules from the mixer granulation or the agglomerating granulation are introduced into a press mold of a press and pressed to shaped articles with pressing pressures between 10 and 60, especially between 20 and 40 MPa in such a way that green shaped articles with raw densities between 1.80 and 2.80, especially between 2.00 and 2.70 g/cm$^3$ are produced, with compressive strengths between 1.5 and 7, especially between 2 and 4 MPa. Preferably a drying is performed between 60 and 200, especially between 90 and 140° C., until a residual moisture content between 0.1 and 0.6, especially between 0.2 and 0.5 wt %, after which the indicated compressive strengths can also develop only after the drying. These green, especially dried green bricks can be handled without further treatment, e.g. stacked and walled up without rupture in an industrial aggregate to be fired, e.g. a large-volume industrial furnace. The porosity, which can be adjusted in controlled manner via the pressing pressure, lies between 22 and 45, especially between 23 and 29 vol %.

The ceramic firing of the bricks is then completed in situ after the walling-up in the fired aggregate, firstly in a surface region facing the fire and then extending gradually further into the interior, after which the desired properties according to the invention, especially with respect to shrinkage and thermal conductivity, are established in the fired zones.

Preferably the green pressed bricks are ceramically fired in a ceramic firing furnace, e.g. a tunnel furnace, between 1200 and 1800, especially between 1400 and 1700° C. In the process, the porosity is changed not at all or only slightly and the desired low thermal conductivity according to the invention can be guaranteed in this way. The thermal conductivity lies, for example, between 10 and 50, especially between 15 and 35% lower than in the commonly used dense working-casing bricks of the same material compositions with up to 21 vol % open porosity. The cold compressive strength lies between 30 and 100, especially between 45 and 80 MPa.

DETAILED DESCRIPTION OF THE PREFERRED EMBODIMENTS

Especially the superiority of coarse ceramic products according to the invention compared with products according to the closest prior art according to DE 10 2006 040 269 B4 and compared with known dense products will be illustrated on the basis of the following examples.

EXAMPLE 1

Bricks on the basis of similar materials and similar mineralogical composition (84 wt % magnesia, 16 wt % fused spinel) with respectively similar binder, namely phenol resin and water with respectively similar binder proportion of 6 wt % relative to the dry mixture and respectively similar manufacturing parameters were manufactured that,
a) in conformity with DE 10 2006 040 269 B4, have a small fraction of grain size >0.5 mm of 11 wt %, small grain-size fractions in the range of 0.1 to 0.5 mm of 4 wt %, as well as 85 wt %<0.1 mm and were compacted with a pressing pressure of 40 MPa
b) in conformity with the present invention, have a small fraction of grain size >0.5 mm of 11 wt %, increased grain-size fractions in the range of 0.1 to 0.5 mm of 37 wt %, as well as 52 wt %<0.1 mm and were compacted with a pressing pressure of 40 MPa
c) in conformity with dense refractory bricks according to the mostly used prior art, have a large fraction of grain size >0.5 mm of 54 wt %; grain-size fractions in the range of 0.1 to 0.5 mm of 9 wt %, as well as 37 wt %<0.1 mm and were compacted with a pressing pressure of 100 MPa.

All bricks were fired for 50 hours under oxidizing conditions at 1600° C. in a tunnel furnace. The grain-size distribution of the mixtures was determined according to DIN 66165-1, the firing shrinkage by measurement, the finished raw density by measurement and weighing, the open porosity according to DIN EN 993-1, the cold compressive strength according to DIN EN 993-5, the cold bending strength according to DIN EN 993-6, the gas permeability according to DIN EN 993-4, the irreversible length change according to DIN EN 993-10 over 12 hours at 1400° C., 1500° C. and 1600° C. The square root of the ratio of gas permeability and open porosity is a measure of the infiltration sensitivity. The thermal shock resistance was determined according to DIN EN 993-11 in air at an elevated test temperature of 1100° C. Furthermore, the bricks were subjected to a multiple firing in order to appraise the volume stability at high service temperature, by then firing the product several times at the manufacturing firing temperature after the manufacturing firing and determining the volume by measurement after each firing.

Figure 1:
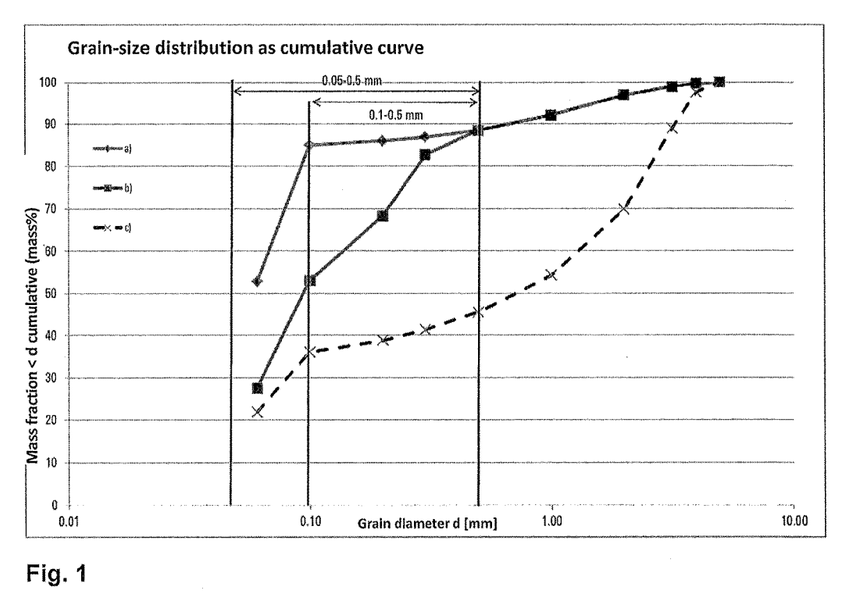
FIG. 1 shows cumulative curves of the grain-size distribution of three bricks (a), b), and c))

FIG. 1 shows the grain-size distribution in Example 1 for a), b) and c) as the cumulative curve.

The following table shows the results of Example 1.

TABLE 1

Values of properties of bricks according to a), b) and c)

| Designation | | a) | b) | c) |
|---|---|---|---|---|
| Compaction | MPa | 40 | 40 | 90-150 |
| Firing temperature | ° C. | 1600 | 1600 | 1600 |
| Finished raw density | g/cm$^3$ | 2.64 | 2.63 | 2.90 |
| Cold compressive strength | MPa | 72.5 | 65.3 | 68.3 |
| Cold bending strength | MPa | 6.3 | 5.2 | 5.1 |
| Open porosity | vol % | 25.7 | 24.6 | 17.0 |
| Gas permeability | nPm | 1.6 | 5.3 | 3.5 |
| Infiltration sensitivity | $10^{-6}$ m | 2.5 | 4.6 | 4.5 |
| Thermal shock resistance in air | cycles | 17 | >30 | >30 |
| Firing shrinkage | lin % | 1.79 | 0.64 | 0.30 |
| Irrev. length change at 1400° C. | lin % | −0.23 | −0.07 | 0.00 |
| Irrev. length change at 1500° C. | lin % | −0.35 | −0.18 | −0.05 |
| Irrev. length change at 1600° C. | lin % | −0.50 | −0.32 | −0.10 |

The brick properties in comparison with the conventional dense bricks according to c) are changed in the case of a), in which all grain-size fractions were reduced in favor of the flour fraction in the mixture and the pressing pressure during shaping was considerably lowered, to the effect that, after the pressing, the finished raw density is significantly decreased and the open porosity is greatly increased. The cold compressive strength of these bricks is slightly increased compared with that of the dense bricks; the cold bending strength is higher. The gas permeability and the infiltration sensitivity are reduced. Besides these changes, which can be assessed as positive, the firing shrinkage is considerably increased and also the post-shrinkage from the post-shrinkage test of the bricks is more than doubled and already sets in at 1400° C. These changes show the problematic or deficient volume stability of the products according to a) during the manufacturing firing and in service. The thermal shock resistance decreases considerably compared with bricks according to c). The test specimen shatters after 17 quenching cycles.

In the case of b) according to the invention, in which significant parts of the reduced coarse-grained and medium-grained fractions were shifted into the 0.1 to 0.5 mm range, the reduction of the finished raw density and the increase of the open porosity are comparable with a). Compared with a), the gas permeability and the infiltration sensitivity are increased, wherein the latter remains in the range of dense products corresponding to c).

In contrast, the firing shrinkage is more than halved compared with a) and the reduction of the post-shrinkage is surprisingly large. Compared with c), the cold compressive strength and the cold bending strength continue to be safely in the range typical of dense bricks. The thermal shock resistance of >30 quenching cycles without rupture is on the same high level as that of the dense products according to c).

A test method that shows the volume stability of refractory products is the determination of the multiple-firing behavior at 1600° C. For this purpose, the product is fired several times repeatedly in the firing aggregate after the manufacturing firing and the volume is respectively determined.

Figure 2:
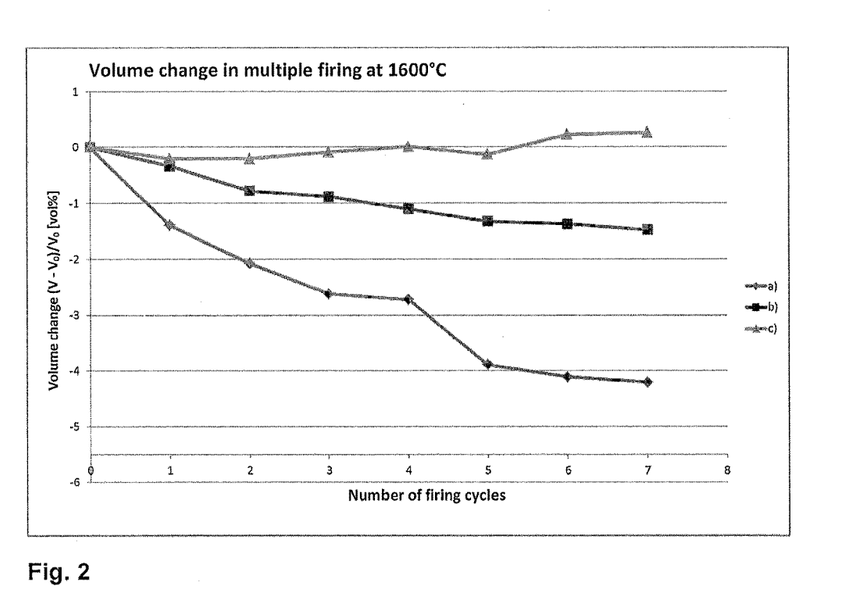
FIG. 2 shows the volume change in multiple firings at 1600° C. of bricks a), b), and c) of FIG. 1.

FIG. 2 shows the volume change in the multiple firing of bricks a), b) and c).

For dense bricks according to c), the volume change relative to the starting volume of the bricks after seven additional firing cycles is approximately 0%. For bricks according to a), the volume change after seven additional firing cycles is already greater than 4%. Aside from the fact that the high porosity established in the bricks in a) is lost and a higher thermal conductivity is again established, a long-lasting accuracy of fit of refractory blocks from such refractory bricks cannot be achieved. For bricks corresponding to b), the volume change relative to the starting volume of the bricks is 1.5%, which is much smaller than for bricks according to a), and so the advantage of the low thermal conductivity remains preserved.

Determination of the Thermal Conductivity of Bricks According to b) and c)

To confirm the desired reduction of the thermal conductivity, thermal conductivity determinations according to the hot-wire method of DIN 993-15 were carried out on porous bricks according to b) with the grain structure according to the invention and on bricks according to c), which correspond to the standard dense so-called rotary kiln bricks according to the prior art, with the following results in Table 2:

TABLE 2

Results of thermal conductivity determinations according to the hot-wire method on bricks according to b) and c)

| | | b) | c) |
|---|---|---|---|
| Thermal conductivity at 300° C. | [W/(mK)] | 5.6 | 6.7 |
| Thermal conductivity at 700° C. | [W/(mK)] | 3.7 | 5.1 |
| Thermal conductivity at 1000° C. | [W/(mK)] | 3.0 | 4.0 |

The measurements were performed at 300° C., 700° C. and 1000° C., Table 2. The results show distinctly reduced thermal conductivity values for the bricks according to b) according to the invention. Relative to the thermal conductivity of c), the thermal conductivity of b) is reduced by 16% at 300° C., by 27% at 700° C. and by 25% at 1000° C.

EXAMPLE 2

Example 2 shows the borderline nature of the grain structure compared with higher coarse-grained fractions As in the first example, bricks on the basis of 84% magnesia and 16% fused spinel were manufactured that,
b) in conformity with the invention, have a small fraction of grain size >0.5 mm of 11 wt %, increased grain-size fractions in the range of 0.1 to 0.5 mm of 37 wt %, as well as 52 wt %<0.1 mm and were compacted with a pressing pressure of 40 MPa (from Example 1), and d) by variation of the grain-size distribution of the grain structure with otherwise equal manufacturing parameters, lie outside the claimed range. The difference in the grain-size distribution is characterized by a shift from grain fractions from the 0.1-0.5 mm range to the next-coarser grain-size range of 0.5-1 mm, so that the 0.1-0.5 mm fractions, with approximately 28 wt %, lie slightly below the minimum value found for this grain size in the invention and that the coarser fractions, with approximately 30% lie slightly above the maximum fraction.

All bricks were fired at 1600° C. and tested in conformity with the bricks from the first example.

Figure 3:
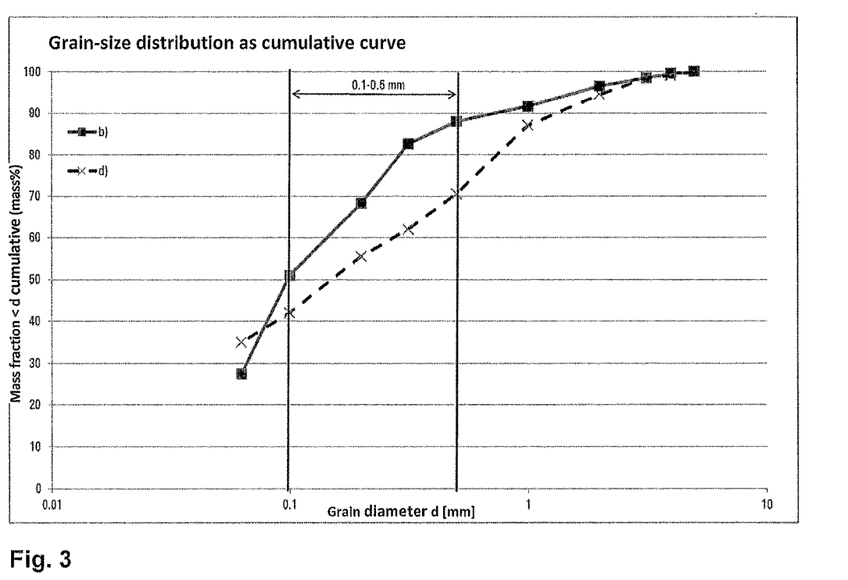
FIG. 3 shows cumulative curves of the grain-size distribution of two bricks (b), and d))

FIG. 3 shows the grain-size distribution for b) and d) as the cumulative curve.

The following table shows the results of Example 2.

TABLE 3

Values of properties of bricks according to b) and d)

| Designation | | b) | d) |
|---|---|---|---|
| Compaction | MPa | 40 | 40 |
| Firing temperature | ° C. | 1600 | 1600 |
| Finished raw density | g/cm$^3$ | 2.63 | 2.78 |
| Cold compressive strength | MPa | 65.3 | 72.4 |
| Cold bending strength | MPa | 5.2 | 5.1 |
| Open porosity | vol % | 24.6 | 20.5 |
| Gas permeability | nPm | 5.3 | 4.5 |
| Infiltration sensitivity | $10^{-6}$ m | 4.6 | 4.7 |
| Thermal shock resistance in air | cycles | >30 | >30 |
| Firing shrinkage | lin % | 0.64 | 0.72 |
| Irrev. length change at 1400° C. | lin % | −0.07 | 0.00 |
| Irrev. length change at 1500° C. | lin % | −0.18 | −0.08 |
| Irrev. length change at 1600° C. | lin % | −0.32 | −0.31 |

The finished raw density of d) is considerably increased compared with b), because of the differences in the grain-size distributions. The open porosity decreases to 20.5 vol % and thus lies in the range of dense products according to the prior art and below the claimed range for the open porosity, Table 3. The infiltration sensitivity is comparable with that of the dense products in case c) from Example 1, despite a slight increase. Even the strengths are again similar to those of standard dense refractory products, wherein the firing shrinkage is increased compared with the dense bricks according to c) from Example 1 and is slightly increased compared with bricks according to the invention corresponding to b). As for other dense products, the post-shrinkage of d) sets in only at higher temperatures and at 1600° C. is comparable with the post-shrinkage of b), albeit with considerably lower open porosity. The thermal shock resistance is good.

Figure 4:
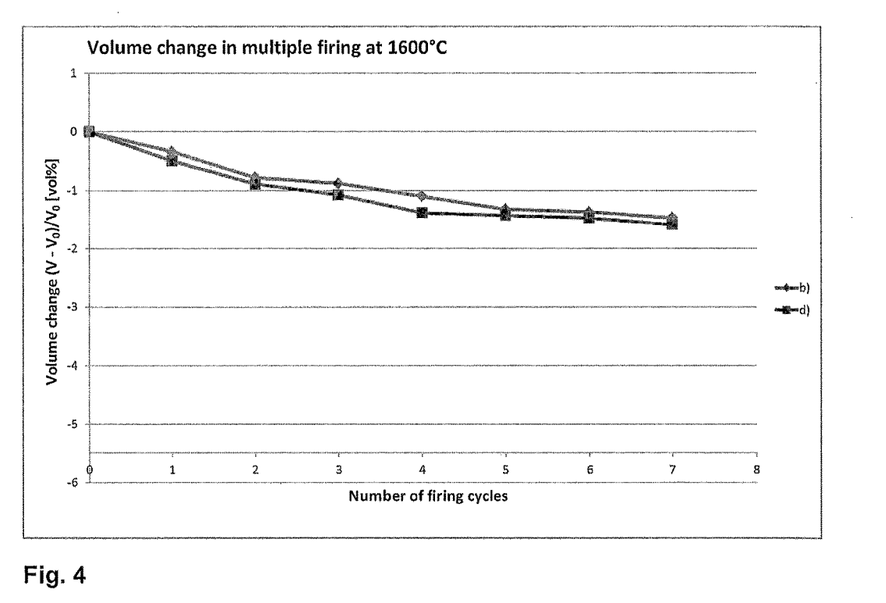
FIG. 4 shows the volume change in multiple firings at 1600° C. of bricks b) and d) of FIG. 3.

The behavior, in the multiple-firing test, of the bricks according to b), which according to the invention are more highly porous and are optimized with respect to their volume stability, is comparable with that of the denser products according to d), FIG. 4.

EXAMPLE 3

Example 3 shows results for even further increased porosity and for the change of the grain structure between that of the lower grain diameter of 0.1 mm as well as of the upper grain diameter of 0.5 mm of the medium-grained fraction.

Bricks on the basis of similar raw materials and similar mineralogical composition with 84% magnesia and 16% fused spinel were manufactured that, a1) in conformity with DE 10 2006 040 269 B4, have a small fraction of grain size >0.5 mm of 11 wt %, small grain-size fractions in the 0.1-0.5 mm range of 4 wt %, as well as 85 wt %<0.1 mm and were compacted with a pressing pressure of only 10 MPa, in order to establish higher porosity in the finished product, and e) in conformity with the invention, have a small fraction of grain size >0.5 mm of 11 wt %, increased grain-size fractions in the 0.1-0.5 mm range of 48 wt %, here lying mainly between 0.1 and 0.2 mm. The fraction <0.1 mm is 35 wt %. These bricks were again compacted with a pressing pressure of 40 MPa, and f) in conformity with the invention, have a small fraction of grain size >0.5 mm of 11 wt %, increased grain-size fractions in the 0.1-0.5 mm range of 50 wt %, here lying mainly between 0.3 and 0.5 mm. The fraction <0.1 mm is 34 wt %. These bricks also were compacted with a pressing pressure of 40 MPa.

All bricks were fired at 1600° C. and tested in conformity with the bricks from the first example.

Figure 5:
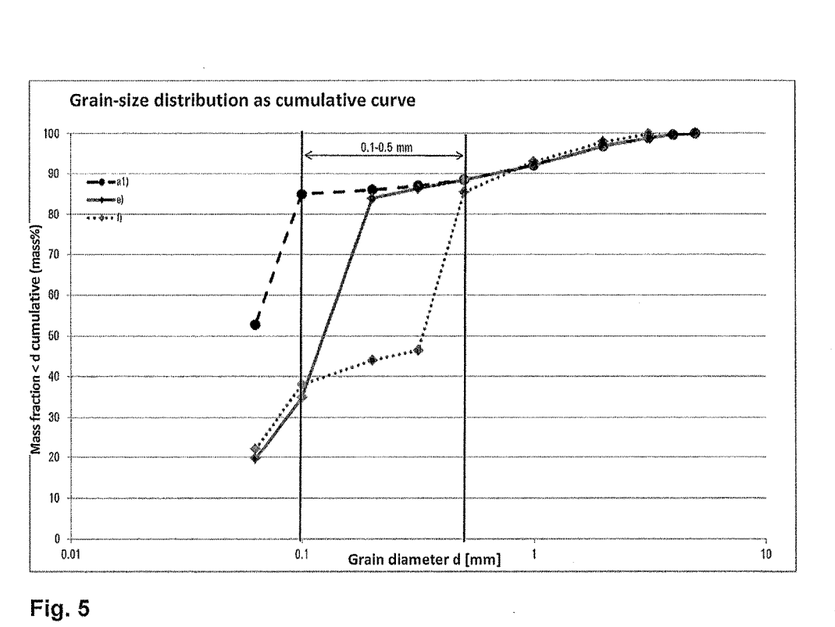
FIG. 5 shows cumulative curves of the grain-size distribution of three bricks (a1), e), and f))

FIG. 5 shows the grain-size distribution for a1), e) and f) as the cumulative curve.

The brick properties in comparison with bricks according to a) are changed in the case of a1), in which the pressing pressure was lowered to 10 MPa, to the effect that the finished raw density is decreased to 2.45 g/cm³ and the open porosity is increased to 29.2 vol %, Table 3. The infiltration sensitivity of a1) is increased compared with bricks according to a) from Example 1. During the manufacturing firing, the bricks shrank by approximately 1.9%. The cold-compressive strength of these bricks is reduced, with approximately 45 MPa; the cold bending strength is decreased only slightly to 5.2 MPa. In the post-expansion post-shrinkage tests at 1400° C., 1500° C. and 1600° C., permanent irreversible length changes of −0.12 lin %, −0.36 lin % and −0.67 lin % develop and compared with a) exhibit a further decreased volume stability of the product. The thermal shock resistance is also decreased noticeably to 8 quenching cycles until rupture.

In the case of e) according to the invention, in which significant parts of the decreased coarse-grained fractions were shifted into the 0.1-0.5 mm range and in the preponderant part are represented by grains between 0.1 and 0.2 mm, a decrease of the finished raw density to 2.50 g/cm³ takes place with unchanged pressing pressure of 40 MPa and the increased open porosity of 28.5% is comparable with that of a1). The infiltration sensitivity is beginning to increase. In contrast to that for a1), the firing shrinkage of 0.56% is not increased. The volume stability is considerably increased compared with a1), which is indicated by an onset of the post-shrinkage only at higher temperature and lower post-shrinkage values in the irreversible length change. In the determination of the thermal shock resistance, no rupture occurs here up to >30 quenching cycles.

TABLE 4

Values of properties of bricks according to a1), e) and f).

|  |  | a1) | e) | f) |
|---|---|---|---|---|
| Compaction | MPa | 10 | 40 | 40 |
| Firing temperature | ° C. | 1000 | 1600 | 1600 |
| Finished raw density | g/cm³ | 2.45 | 2.50 | 2.64 |
| Cold compressive strength | MPa | 44.7 | 52.8 | 54.4 |
| Cold bending strength | MPa | 5.2 | 5.8 | 5.3 |
| Open porosity | vol % | 29.2 | 28.5 | 23.8 |
| Gas permeability | nPm | 4.9 | 11.6 | 20.5 |
| Infiltration sensitivity | 10⁻⁶ m | 4.1 | 6.4 | 9.3 |
| Thermal shock resistance in air | cycles | 8 | >30 | >30 |

TABLE 4-continued

Values of properties of bricks according to a1), e) and f).

|  |  | a1) | e) | f) |
|---|---|---|---|---|
| Firing shrinkage | lin % | 1.94 | 0.56 | 0.29 |
| Irrev. length change at 1400° C. | lin % | −0.12 | 0.00 | 0.00 |
| Irrev. length change at 1500° C. | lin % | −0.36 | −0.13 | −0.09 |
| Irrev. length change at 1600° C. | lin % | −0.67 | −0.25 | −0.15 |

In the further case of f) according to the invention, in which significant parts of the decreased coarse-grained and medium-grained fractions were shifted into the 0.1-0.5 mm range and in the preponderant part here are represented here by grains between 0.3 and 0.5 mm, a decrease of the finished raw density to 2.64 g/cm³ takes place with unchanged pressing pressure of 40 MPa and the increase of the open porosity to 23.8% is smaller than in a1) and e). However, it is considerably higher than for dense products and thus is in the range according to the invention. The infiltration sensitivity is increased in bricks according to f). The firing shrinkage is decreased to 0.29 lin %.

The irreversible length change of this more porous product decreases once again and is comparable with that of dense products according to c) from Example 1. The same is true for the thermal shock resistance.

Figure 6:
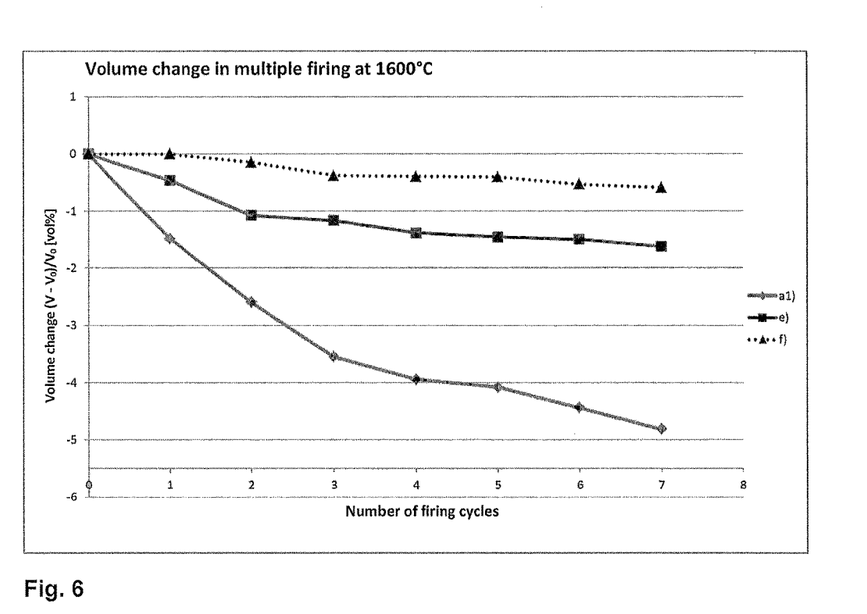
FIG. 6 shows the volume change in multiple firings at 1600° C. of bricks a1), e), and f) of FIG. 5.

FIG. 6 shows the volume change in the multiple firing of bricks according to a1), e) and f).

The volume change in the multiple firing for the porous bricks according to a1) that are not according to the invention is marked by a large shrinkage. Relative to the starting volume of the finished product, approximately 5 vol % is lost after 7 additional firing cycles, FIG. 6. For comparable open porosity in the finished-product condition of e), this product loses only small volume fractions and after 7 additional firing cycles has shrunk only by approximately 1.6 vol %. Even the more porous bricks according to f) according to the invention clearly exhibit the advantageous volume stability and even lose only approximately 0.6 volt after 7 additional firing cycles.

EXAMPLE 4

In the first Examples 1 to 3, the advantages of the grain structure according to the invention were explained for magnesia spinel bricks. For demonstration of the effectiveness of the invention for products from other refractory materials, bricks on the basis of 84 mass % of iron-rich sintered magnesia in combination with 16 mass % fused pleonast and bricks on the basis of fireclay and on the basis of andalusite were manufactured as examples. During the manufacture of the latter two, bond clay (5%) was added to the mixtures, as is customary for such bricks.

The bricks from the different refractory materials were respectively provided with grain-size distributions a), b) and c) as in Example 1, FIG. 1 from Example 1. For this purpose, bricks were manufactured that were a) in conformity with DE 10 2006 040 269 B4, provided with a small fraction of grain size >0.5 mm of 11 wt %, with small grain-size fractions in the range of 0.1 to 0.5 mm of 4 wt %, as well as 85 wt %<0.1 mm and compacted with a pressing pressure of 40 MPa b) in conformity with the present invention, provided with a small fraction of grain size >0.5 mm of 11 wt %, increased grain-size fractions in the range of 0.1 to 0.5 mm of 37 wt %, as well as 52 wt %<0.1 mm and also compacted with a pressing pressure of 40 MPa, c) in conformity with dense refractory bricks according to the mostly used prior art, provided with a large fraction of grain size >0.5 mm of 54 wt %; grain-size fractions in the range of 0.1 to 0.5 mm of 9 wt %, as well as 37 wt %<0.1 mm and respectively compacted with a pressing pressure typical of the product.

Table 5 presents the pressing pressures and firing temperatures typical of the product as well as the results from the determinations of the finished raw density by measurement and weighing, the open porosity according to DIN EN 993-1, the cold compressive strength according to DIN EN 993-5, the cold bending strength according to DIN EN 993-6, the gas permeability according to DIN EN 993-4, the irreversible length change according to DIN EN 993-10 over 12 hours at 1300° C., 1400° C. and 1500° C., the thermal shock resistance according to DIN EN 993-11 in air at an elevated test temperature of 1200° C. and the square root of the ratio of gas permeability and open porosity as a measure of the infiltration sensitivity.

here to 3.8 μm. Due to the grain structure according to the invention, the firing shrinkage is increased only slightly to 0.3 lin % and also the irreversible length change of −0.16 lin % exhibits a considerably smaller increase of the post-shrinkage than do bricks corresponding to a). In the determination of the thermal shock resistance, no rupture occurred up to 30 quenching cycles.

Fireclay Bricks:

In comparison with the values of properties of c), the fireclay bricks according to a) have a reduced finished raw density of 1.95 g/cm$^3$; the open porosity is increased to 29.3 vol %. The cold compressive strength decreases to 33.3 MPa and the cold bending strength to 4.5 MPa. The infiltration sensitivity is decreased to 2.6 μm. Associated with the increase of the open porosity, the firing shrinkage is increased to 1.8 lin %. The irreversible length change is characterized by a considerable post-shrinkage of −1.47 lin % setting in at a test temperature of 1400° C.; at the next-higher test temperature of 1500° C. the post-shrinkage increases greatly to −3.6 lin %. In the determination of the thermal shock resistance, no rupture occurred up to 30 quenching cycles.

TABLE 5

Values of properties of magnesia-pleonast bricks on the basis of iron-rich sintered magnesia, fireclay and andalusite bricks, respectively according to a), b) and c)

| Designation | | Iron-rich sintered magnesia with pleonast | | | Fireclay with 5% bond clay | | | Andalusite with 5% bond clay | | |
|---|---|---|---|---|---|---|---|---|---|---|
| | | a) | b) | c) | a) | b) | c) | a) | b) | c) |
| Compaction | MPa | 40 | 40 | 150 | 40 | 40 | 90 | 40 | 40 | 115 |
| Firing temperature | ° C. | 1450 | 1450 | 1450 | 1400 | 1400 | 1400 | 1450 | 1450 | 1450 |
| Finished raw density | g/cm$^3$ | 2.23 | 2.40 | 3.09 | 1.95 | 2.04 | 2.21 | 2.13 | 2.21 | 2.57 |
| Cold compressive strength | MPa | 38.9 | 39.9 | 97.3 | 33.3 | 39.7 | 53.7 | 100.4 | 90.2 | 111.8 |
| Cold bending strength | MPa | 4.2 | 3.5 | 5.5 | 4.5 | 5.5 | 6.1 | 14.4 | 12.8 | 15.8 |
| Open porosity | vol % | 32.1 | 27.8 | 14.5 | 29.3 | 26.6 | 17.3 | 26.6 | 24.5 | 12.4 |
| Gas permeability | nPm | 4.1 | 3.9 | 3.9 | 1.9 | 2.3 | 1.9 | 1.7 | 2.1 | 2.4 |
| Infiltration sensitivity | 10$^{-6}$ m | 3.6 | 3.8 | 5.2 | 2.6 | 2.9 | 3.3 | 2.5 | 2.9 | 4.4 |
| Thermal shock resistance in air | cycles | 5 | >30 | >30 | >30 | >30 | >30 | 4 | >30 | >30 |
| Firing shrinkage | lin % | 0.62 | 0.30 | 0.21 | 1.80 | 1.10 | 0.78 | 0.20 | −0.09 | −0.80 |
| Irrev. length change at 1300° C. | lin % | 0.00 | 0.02 | −0.03 | −0.04 | −0.04 | −0.03 | 0.00 | 0.00 | 0.03 |
| Irrev. length change at 1400° C. | lin % | −0.04 | −0.02 | −0.05 | −1.47 | −0.62 | −0.12 | −0.07 | −0.02 | 0.00 |
| Irrev. length change at 1500° C. | lin % | −0.63 | −0.16 | −0.10 | −3.60 | −1.88 | −1.30 | −0.85 | −0.31 | −0.09 |

Magnesia-Pleonast Bricks on the Basis of Iron-Rich Sintered Magnesia:

Bricks according to a) in conformity with DE 10 2006 040 269 B4 differ from the dense bricks according to c) by a lower finished raw density of 2.23 g/cm$^3$ and an open porosity increased to 32.1 vol %. The cold compressive strength decreases to 38.9 MPa and the cold bending strength to 4.2 MPa. The infiltration sensitivity is decreased to 3.6 μm. Associated with the increase of the open porosity, the firing shrinkage is tripled to 0.62 lin %. The irreversible length change, which amounts to 6 times that compared with c), is characterized by a post-shrinkage setting in at a test temperature of 1500° C. The thermal shock resistance is greatly reduced to 5 quenching cycles to rupture of the test specimen. These bricks are not resistant to thermal shock.

Bricks with grain structure according to the invention according to b) have a finished raw density of 2.40 g/cm$^3$; compared with c), their open porosity is doubled. The cold compressive strength is 39.9 MPa and the cold bending strength 3.5 MPa. The infiltration sensitivity is decreased Fireclay bricks with grain structure according to the invention according to b) have a finished raw density of 2.04 g/cm$^3$; compared with c), their open porosity is increased and amounts to 26.6 vol %. The cold compressive strength is 39.7 MPa and the cold bending strength 5.5 MPa. The infiltration sensitivity is decreased here to 2.9 μm. Due to the grain structure according to the invention, the firing shrinkage is increased to only 1.1 lin % and the irreversible length change of −0.62 lin % exhibits a more advantageous post-shrinkage than do bricks corresponding to a). At 1500° C., the irreversible length change is increased to −1.88% and thus remains considerably smaller than for bricks according to a). In the determination of the thermal shock resistance, no rupture occurred up to 30 quenching cycles.

Andalusite Bricks:

The properties of andalusite bricks reflect the mineralogical phase transformation of the primary raw material. Because of the mullitization of the andalusite, the firing shrinkage of the dense bricks according to c) is negative; the dense bricks expand by 0.8 lin %. For bricks according to a), the expansion resulting from the phase transformation is over-compensated by more intensive sintering of the very fine-grained material; the bricks shrink by 0.2 lin %. The finished raw density is decreased to 2.13 g/cm$^3$ and the open porosity increases to 26.6 vol %. The cold compressive strength is 100.4 MPa and the cold bending strength is 14.4 MPa. The infiltration sensitivity is decreased to 2.5 μm. A significant post-shrinkage sets in at 1500° C., with a value of −0.85 lin % for the irreversible length change. The thermal shock resistance is poor, with 4 quenching cycles to rupture.

Andalusite bricks according to the invention according to b) remain in the range of the firing expansion; their finished raw density is decreased to 2.21 g/cm$^3$ and the open porosity is increased to 24.5 vol %. The cold compressive strength is 90.2 MPa and the cold bending strength is 12.8 MPa. The post-shrinkage sets in at 1500° C., with a value of −0.31 lin % for the irreversible length change, which is considerably reduced compared with a). The infiltration sensitivity is decreased to 2.9 μm. In the determination of the thermal shock resistance, no rupture occurs up to 30 quenching cycles.

Regardless of the material choice, all bricks according to the invention according to b) exhibit the features of clearly higher open porosity compared with the dense products according to c) and unchanged or reduced infiltration sensitivity, wherein the firing shrinkages and irreversible length changes that occur are changed to a much smaller extent than for more porous bricks according to a). Drastic losses in the thermal shock resistance, as in the bricks according to a), do not occur in the bricks according to the invention according to b). For the magnesia-fused pleonast bricks, fireclay bricks and the andalusite bricks as well as the magnesia-spinel bricks mentioned in Examples 1 to 3, the strengths remain in the range of values typical of the products.

Example 4 is intended not to limit the invention to the mentioned materials, but instead to show that the invention works independently of the refractory material.

The invention claimed is:

1. A working casing in a large-volume industrial furnace, wherein the working casing comprises a coarse refractory product in a form of pressed shaped bricks or in a form of an unshaped monolithic lining,
wherein the coarse ceramic refractory product comprises at least one grainy refractory material, an open porosity between 22 and 45 vol %, and a grain structure of the refractory material in which a medium-grained fraction with grain sizes between 0.1 and 0.5 mm amounts to 10 to 55 wt %, and
wherein the rest of the grain structure is a flour-grained fraction with grain sizes up to 0.1 mm and/or a coarse-grained fraction with grain sizes over 0.5 mm.

2. The working casing according to claim 1, wherein the coarse refractory product comprises the following grain structure:
the flour-grained fraction up to 0.1 mm: 20 to 61 wt %,
the medium-grained fraction 0.1 to 0.5 mm: 30 to 55 wt %, and
the coarse-grained fraction above 0.5 mm: 9 to 25 wt %.

3. The working casing according to claim 1, wherein the refractory product contains at least one binder for refractory products and/or at least one agent for refractory products and/or at least one additive for refractory products.

4. The working casing according to claim 3, wherein the coarse refractory product contains, as binder, water and/or tar and/or pitch and/or at least one synthetic-resin binder and/or lignin sulfonate.

5. The working casing according to claim 1, wherein the coarse refractory product is ceramically fired or unfired or tempered and unfired.

6. The working casing according to claim 1, wherein the coarse refractory product exists in the form of an unfired, green, pressed shaped brick and comprises raw densities between 1.80 and 2.80 g/cm$^3$, as well as compressive strengths between 1.5 and 7.

7. The working casing according to claim 1, wherein the coarse refractory product is ceramically fired and has a cold compressive strength between 30 and 100 MPa.

8. The working casing according to claim 1, wherein the material is at least one material from the following group: magnesia, doloma, magnesium aluminate spinel, hercynite, forsterite, pleonast, chromium ore, zirconia, calcium aluminate, calcium hexaaluminate, alumina and/or aluminosilicate raw materials, SiC, bond clay, fireclay, andalusite, and bauxite.

9. Use of a working casing according to claim 1, as the working casing in cement kiln systems, lime shaft kilns or lime rotary kilns, heating furnaces or furnaces for energy generation.

10. The working casing according to claim 1, wherein the coarse refractory product comprises an open porosity between 23 and 29 vol %.

11. The working casing according to claim 1, wherein the medium-grained fraction amounts to 35 to 50 wt %.

12. The working casing according to claim 2, wherein the coarse refractory product comprises the following grain structure:
the flour-grained fraction up to 0.1 mm: 25 to 55 wt %,
the medium-grained fraction 0.1 to 0.5 mm: 35 to 50 wt %, and
the coarse-grained fraction above 0.5 mm: 10 to 25 wt %.

13. The working casing according to claim 2, wherein the coarse-grained fraction has a grain size up to 8 mm.

14. The working casing according to claim 3, wherein the at least one binder is contained in proportions up to 9 wt %.

15. The working casing according to claim 3, wherein the at least one agent is contained in proportions up to 10 wt %.

16. The working casing according to claim 3, wherein the at least one additive is contained in proportions up to 10 wt %.

17. The working casing according to claim 4, wherein the synthetic-resin binder is a phenol formaldehyde or furan or novolac resin.

18. The working casing according to claim 6, wherein the coarse refractory product comprises raw densities between 2.00 and 2.70 g/cm$^3$ as well as compressive strengths between 2 and 4 MPa.

19. The working casing according to claim 18, wherein the coarse refractory product comprises a residual moisture content between 0.1 and 0.6 wt %.

20. The working casing according to claim 7, wherein the coarse refractory product has a cold compressive strength between 45 and 80 MPa.

21. The working casing according to claim 8, wherein the material is at least one material selected from the group consisting of:
magnesia with magnesium aluminate spinel;
magnesia with hercynite,
magnesia with forsterite,
magnesia with pleonast, and
magnesia with chromium ore.

* * * * *